J. J. WESCOTT.
SHOCK ARRESTER.
APPLICATION FILED AUG. 5, 1913.
1,147,059.
Patented July 20, 1915.
2 SHEETS—SHEET 1.
Fig. 1.
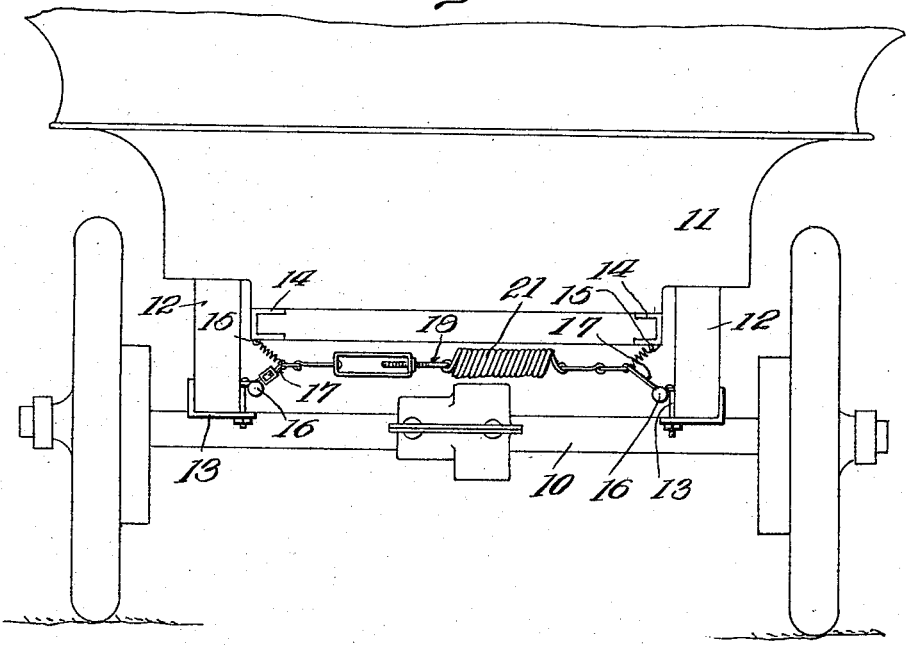
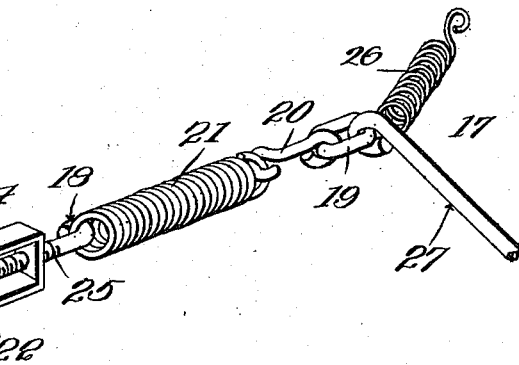
Fig. 2.
Inventor
J. J. Wescott.

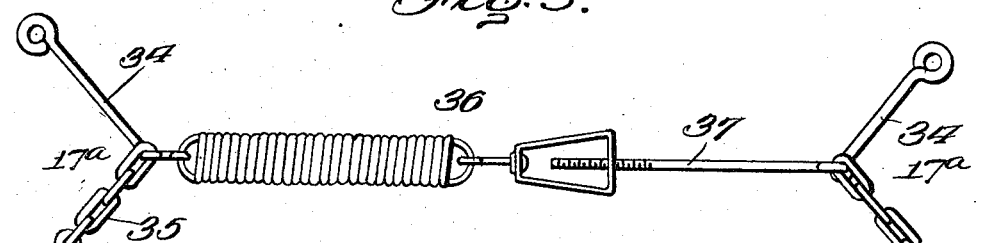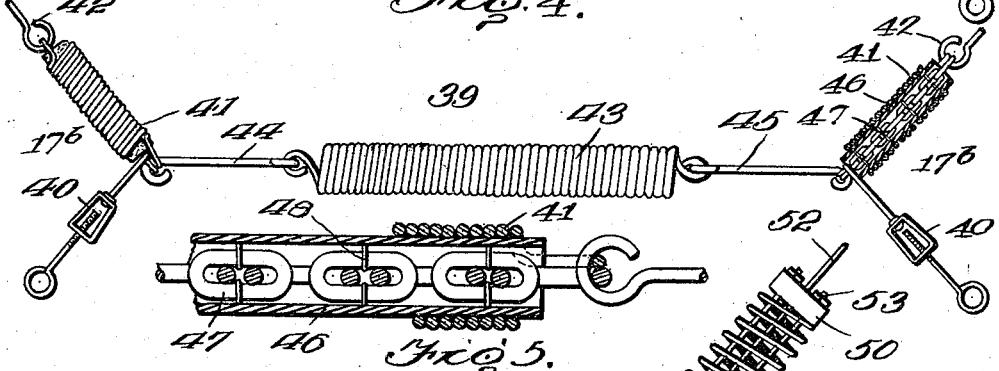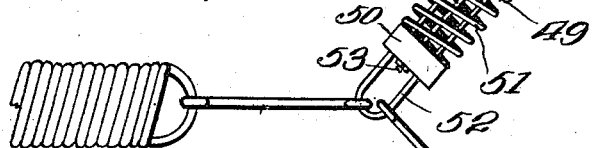

UNITED STATES PATENT OFFICE.

JOHN J. WESCOTT, OF MONROE, WISCONSIN.

SHOCK-ARRESTER.

1,147,059.  Specification of Letters Patent.  Patented July 20, 1915.

Application filed August 5, 1913.  Serial No. 783,164.

*To all whom it may concern:*

Be it known that I, JOHN J. WESCOTT, citizen of the United States, residing at Monroe, in the county of Green and State of Wisconsin, have invented certain new and useful Improvements in Shock-Arresters, of which the following is a specification.

My invention relates to new and useful improvements in shock arresters for vehicles, particularly for motor vehicles, the primary object of my invention being the provision of a shock arrester which may be so mounted and adjusted upon the vehicle as to give the effect of an additional load, thereby greatly improving the riding qualities of the vehicle when lightly loaded.

A further object of my invention is to provide a shock arrester which may be employed upon any type of vehicle and in any one of a number of positions and with any type of springs now in use and which will in no way decrease the resiliency of the original vehicle springs but which will in effect augment or increase the same, while at the same time it will serve as an absolute check against rebound or up throw of the vehicle body.

Inasmuch as the breaking of vehicle springs is usually due to the rebound of the vehicle body, it will be clear that a shock arrester of the above type, which serves as an absolute check for the rebound, will prevent breakage of the springs. Because of this checking effect it is possible to use more flexible springs, and in the use of elliptic springs, springs having longer leaves and greater resiliency, thereby greatly improving the easy riding qualities of the vehicle.

I accomplish the above results by the provision of the novel mechanism hereinafter more particularly set forth, illustrated in the drawings hereto attached and pointed out in the appended claims.

In the drawings: Figure 1 is a fragmentary rear elevation of a conventional form of motor vehicle, showing my improved shock arrester applied thereto; Fig. 2 is a perspective view of the shock arrester removed from the vehicle; Fig. 3 is a similar view, showing a further modification; Fig. 4 is a side elevation partially in section of a still further modified form of shock arrester constructed to act as a positive check to limit the rebound of the vehicle body; Fig. 5 is a fragmentary enlarged sectional view of the part shown in section in Fig. 4, showing certain details in construction; Fig. 6 is a fragmentary elevational view of the shock arrester of the type shown in Fig. 2 but employing a slightly different form of spring in the inclined yieldable member, the spring here shown in itself acting as a positive check to limit the rebound of the vehicle body.

Corresponding and like parts are referred to in the following description and indicated in all the views of the drawings by the same reference characters.

My shock arrester may be mounted upon practically any portion of the vehicle, the only absolute requirement being that the free ends of one or both of the oppositely inclined members be attached to relatively movable parts of the vehicle, such as the body and running gear, upper and lower members of double elliptic springs, or springs and frame. For the sake of clearness I have illustrated the shock arrester as applied in one position, this position being perhaps one of the commonest in which it will be employed.

In Fig. 1 I have illustrated a conventional form of motor vehicle having a rear axle 10 and body 11 supported upon the axle by double elliptic springs 12, the shock arrester being extended between clips 13 carried by the lower leaves of the springs against the rear axle and plate 14 secured to the rear end portion of the frame of the vehicle and having perforated ears 15. Each of the clips employed is in the form of a clevis bolt passed about the spring and terminating at one end in an eye 16. The shock arrester includes two pairs of oppositely inclined members 17, the free ends of which are pivotally connected to the ears 15 and eyes 16 and an adjustable resilient connection between the pivotally connected ends of the pairs of members, said resilient connection being indicated as a whole by the numeral 18. This connection includes, at each end, an eye 19. A link 20 is connected at one end to one of the eyes 19 and by its other end to one end of a strong helical spring 21, a turn buckle 22 connecting the opposite end of the spring 21 with the other eye 19. This turn buckle includes a link 23 connected to the eye, a frame 24 swiveled upon the free end of the link 23 and a second link 25 connected by one end to the spring and having its opposite end threaded for engagement in a threaded bore formed in the frame and in alinement with the body portion of the link 23. Each pair of oppositely inclined members 17 includes a relatively small helical spring 26, the strength of which is considerably greater than that of the spring 21 and a link 27. The link 27, in one instance, is solid throughout its length, being provided at its ends with eyes for attachment to the eye 19 and to the eye 16. In the other instance the link 27 is made up of two parts 28 and 29 having their free ends threaded for engagement in alined bores of a turn buckle frame 30, this construction permitting adjustment of the inclined rigid connection 27 as well as of the resilient connection 18. Of course it will be clear that each of the links 27 may be made in a single piece or each may be provided with a turn buckle structure, as preferred.

In use, the shock arrester is applied in the manner shown in Fig. 1 and the turn buckle so adjusted as to cause the shock arrester to exert a general downward pull upon the vehicle body, thus having the effect of an additional load in the vehicle. For this reason, during relative downward movement of the vehicle body, the shock arrester will in effect act against the usual springs of the vehicle tending to increase the downward movement, in the same manner as would an extra load upon the vehicle. Upon the rebound, however, the shock arrester is more quickly brought into play and quickly but gently checks upward movement of the vehicle body past normal position. It will of course be clear that this form of shock arrester, simple as it is, permits of an almost infinite number of modifications and for this reason I have illustrated in Figs. 3 to 6 a number of slightly modified forms of shock arrester, although I do not wish in any way to limit myself to only such forms as I have shown in the drawings.

The form of shock arrester shown in Fig. 3 includes a pair of oppositely inclined members 17ª, each consisting of a link 34 and a length of chain 35, these pairs of members being connected by a connecting member 36 practically identical in construction with the previously described connecting member, the sole difference being that the terminal, threaded link 37 of the turn buckle, is connected directly to one of the pairs of oppositely inclined members, instead of intermediately through a ring.

In Figs. 4 and 5 I have illustrated a shock arrester constructed to permit a wide range of adjustment of parts and further constructed to act as a positive check to limit the rebound of the vehicle body to which it is attached. This shock arrester includes two pairs of oppositely inclined members 17ᵇ and a connecting member 39. One member of each of the pairs of members consists of a turn buckle 40, while the other member consists of a helical expansion spring 41 and a link 42. The connecting member includes the usual helical spring 43 and links 44 and 45. The springs 41 inclose a flexible sleeve 46 of leather or other suitable material and extending through these sleeves are chains 47, certain links of which are slidably connected to the sleeve by staples or other suitable fastening devices 48. As best shown in the sectional view of Fig. 5, these chains, under normal condition, are loose, this being necessary to permit a limited expansion of the springs 41 before the chains become tight and act as a check against further upward movement of the vehicle body. The leather sleeves hold the chains in proper position, prevent them from becoming caught in the springs surrounding them when the springs are extended and do away with any noise which might otherwise be caused by the scraping of the chains against the springs.

In place of springs inclosing chains, as shown in Figs. 4 and 5, the shock arrester of the type there shown, may be constructed with compression springs 49 as shown in Fig. 6. In this form of device a pair of cup-shaped heads 50 are provided, a helical compression spring 51 being mounted between the heads. U-shaped coupling members 52 are then passed one from each end through both heads and secured by nuts 53, leaving the bight portions of the coupling members extending beyond the heads to form attaching rings. With a spring so constructed, it will be apparent that after strain has been applied to the coupling members to draw the same away from each other and consequently to compress the spring between the heads to a certain extent, the coils of the springs will be brought into engagement one with the other and so act as a positive check to limit further movement of the coupling member. With this type of spring it is therefore unnecessary to employ chains or other means for limiting the action of the springs.

By forming certain of the parts of the pairs of oppositely inclined members flexible, by making them of springs or chains, all likelihood of their exerting undue strain upon the frame of the vehicle is avoided. This is of particular importance if the shock arrester is to be employed across the front of the machine or longitudinally of the machine. Furthermore, the shock arrester is less liable to break under unusual strain of the vehicle frame or twisting thereof.

By proper adjustment of the turn buckles, the shock arresters may be made to exert any amount of downward pull upon the vehicle body and adjustment may therefore be made to insure easy riding, irrespective of the load which the vehicle is to carry, the lighter the load carried the greater the extent to which the arrester should be tensioned.

If the shock arrester is to be employed lengthwise of the vehicle body, both pairs of oppositely inclined members may be used or but one of such pairs, as preferred. In this latter case one end of the connecting member would be secured directly to the vehicle or frame, while the oppositely inclined members would be connected in the usual manner at their free ends to relatively movable parts of the vehicle.

It will of course be understood that I do not wish in any way to limit myself to the specific details of construction illustrated in the drawings and described in the specification, as various minor changes may be made at any time, within the scope of the appended claims, without in the slightest degree departing from the spirit of my invention.

Having thus described the invention, what is claimed as new is:

1. A shock absorber comprising opposed rigid members having an opposite inclination, flexible members connected to the converged ends of the rigid members and inclining in an opposite direction thereto and to each other, and a contractile yieldable connection attached at its ends to the opposite converging members at the points of juncture of the rigid and flexible members.

2. A shock absorber comprising spaced pairs of oppositely inclined members, one member of each pair being rigid in its length and the other member of each pair being flexible in its length, a contractile yieldable connection attached at its ends to the pairs of members at the points of convergence of their rigid and flexible members, and means in the length of the contractile yieldable connection to vary the tension thereof.

3. A shock absorber comprising opposed pairs of oppositely inclined members, one member of each pair being rigid in its length and the other member of each pair being longitudinally elastic and a contractile yieldable connection attached at its ends to the pairs of members at the points of convergence of their rigid and flexible members.

4. A shock absorber comprising opposed pairs of oppositely inclined members, one member of each pair being rigid in its length and the other member of each pair being longitudinally elastic, means in the length of the rigid members for varying their length, and a contractile yieldable connection attached at its ends to the pairs of members at the points of convergence of their rigid and longitudinally elastic members.

In testimony whereof I affix my signature in presence of two witnesses.

JOHN J. WESCOTT. [L. S.]

Witnesses:
  J. B. HEEREN,
  C. A. SCHINDLER.

Copies of this patent may be obtained for five cents each, by addressing the "Commissioner of Patents, Washington, D. C."